(12) United States Patent
Kimura

(10) Patent No.: US 7,745,617 B2
(45) Date of Patent: Jun. 29, 2010

(54) METALLOPHTHALOCYANINE MIXED CRYSTAL AND PHTHALOCYANINE PIGMENT CONTAINING THE SAME

(75) Inventor: Shuuichi Kimura, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 1180 days.

(21) Appl. No.: 10/973,415

(22) Filed: Oct. 27, 2004

(65) Prior Publication Data

US 2005/0092208 A1     May 5, 2005

(30) Foreign Application Priority Data

Oct. 31, 2003    (JP)   ............................ 2003-372896

(51) Int. Cl.
    *C07B 47/00*      (2006.01)
(52) U.S. Cl. .................................... 540/145
(58) Field of Classification Search ................. 540/145
     See application file for complete search history.

(56) References Cited

U.S. PATENT DOCUMENTS 5,449,581 A * 9/1995 Matsui et al. .............. 430/58.8
6,093,514 A * 7/2000 Yamasaki et al. ............. 430/78

FOREIGN PATENT DOCUMENTS

| JP | 11-349845 | 12/1999 |
|----|-----------|---------|
| JP | 2000-129156 | 5/2000 |
| JP | 2000-219817 | 8/2000 |

* cited by examiner

*Primary Examiner*—James O. Wilson
*Assistant Examiner*—Paul V. Ward
(74) *Attorney, Agent, or Firm*—Nixon & Vanderhye P.C.

(57) ABSTRACT

A mixed crystal consists of a first metallophthalocyanine compound selected from metallophthalocyanine compounds having at least one trifluoromethyl group and having a central metal selected from the group consisting of cobalt, nickel and copper, and a second metallophthalocyanine compound selected from metallophthalocyanine compounds optionally having at least one substituent group other than trifluoromethyl group and having a central metal selected from the group consisting of cobalt, nickel and copper. The mixed crystal exhibits a peak at $2\theta$ of 5.9 to 6.4° in X-ray diffractometry.

3 Claims, 4 Drawing Sheets

METALLOPHTHALOCYANINE MIXED CRYSTAL AND PHTHALOCYANINE PIGMENT CONTAINING THE SAME

CROSS-REFERENCE TO RELATED APPLICATIONS

This application is based upon and claims the benefit of priority from prior Japanese Patent Application No. 2003-372896, filed Oct. 31, 2003, the entire contents of which are incorporated herein by reference.

BACKGROUND OF THE INVENTION

1. Field of the Invention

The present invention relates to a metallophthalocyanine mixed crystal which can be used in, for example, an ink or a paint, and to a phthalocyanine pigment containing the same.

2. Description of the Related Art

For copper phthalocyanine, α-type, γ-type, σ-type, ε-type, R-type, X-type, π-type, ρ-type, and β-type are known as its crystal types.

Among these, the α-type one, which has a slightly reddish blue hue, the β-type one, which has a greenish blue hue, and the ε-type one, which has a reddish blue hue, are used in many cases as the blue pigment. However, the single use of the α-type, the β-type or the ε-type copper phthalocyanine cannot comply with the demands for the blue color of various hues accompanying the diversification of tastes. Therefore, in order to produce the intermediate color tone, a plurality of different pigments have been mixed for toning. However, the toning by pigment mixing lowers the clearness of the color (see "Polymorphic Characterizations of Phthalocyanines and Applications for Electrophotographic Photoreceptors" by Toshio Enokida, Chiba University Doctoral Thesis, 1992 and "Text for 43rd Pigment Introduction Course" by the Corporate Juridical Person Color Material Association, 2001).

BRIEF SUMMARY OF THE INVENTION

An object of the present invention is to provide a metallophthalocyanine mixed crystal which has a blue hue different from that of the copper phthalocyanine pigment of the crystal type known in the art, exhibits a clearness which cannot be achieved by mixing the copper phthalocyanine pigments of different crystal types, and is useful as a blue pigment, and to provide a phthalocyanine pigment containing this mixed crystal.

According to a first aspect of the present invention, there is provided a mixed crystal consisting of a first metallophthalocyanine compound selected from metallophthalocyanine compounds having at least one trifluoromethyl group and having a central metal selected from the group consisting of cobalt, nickel and copper, and a second metallophthalocyanine compound selected from metallophthalocyanine compounds optionally having at least one substituent group other than trifluoromethyl group and having a central metal selected from the group consisting of cobalt, nickel and copper, the mixed crystal exhibiting a peak at 2θ of 5.9 to 6.4° in X-ray diffractometry.

According to a second aspect of the present invention, there is provided a phthalocyanine pigment comprising a metallophthalocyanine mixed crystal according to the present invention.

DETAILED DESCRIPTION OF THE INVENTION

Figure 1:
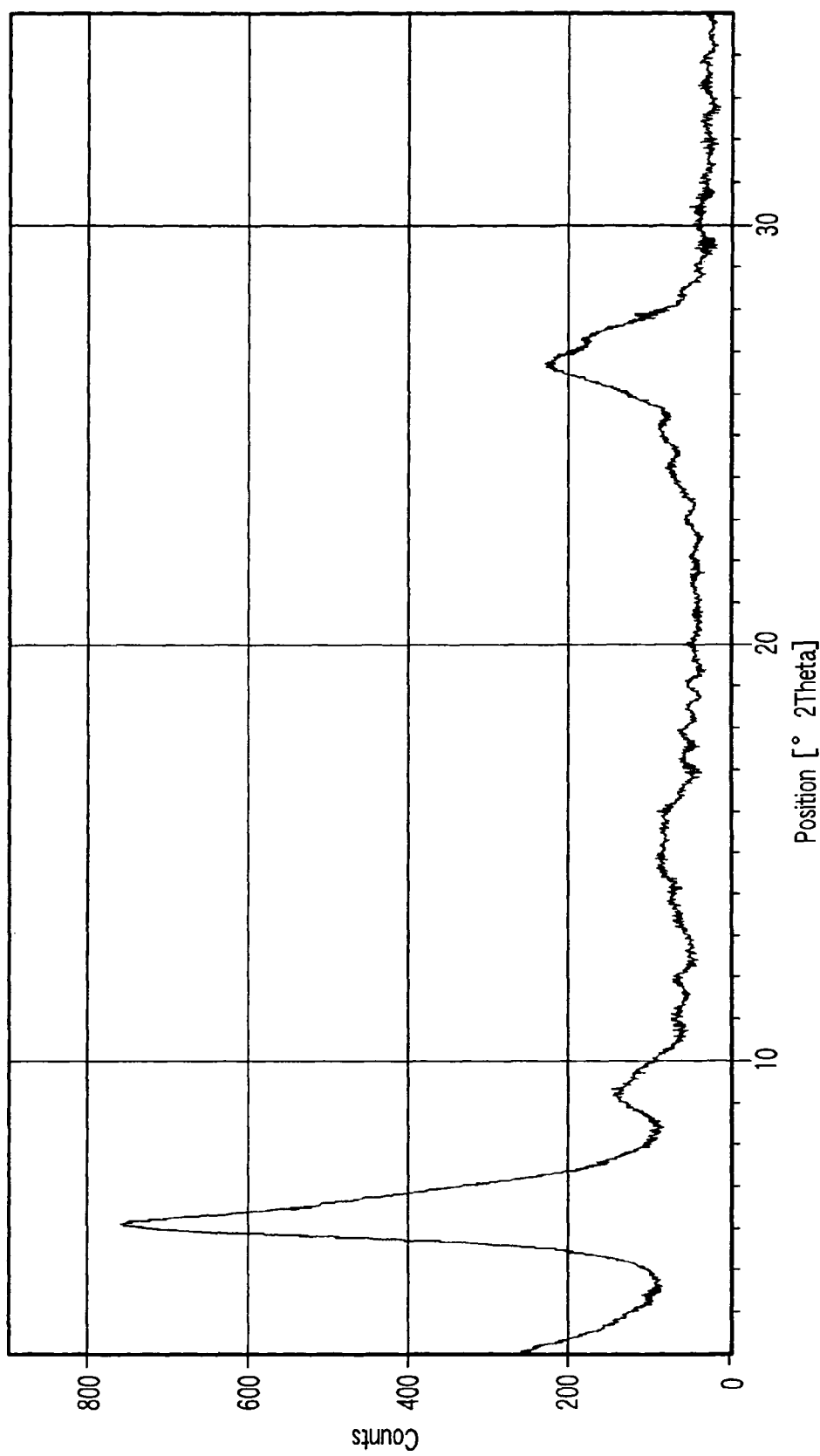
FIG. 1 is an X-ray diffraction pattern of the metallophthalocyanine mixed crystal prepared in Example 1, which will be described herein later.

A metallophthalocyanine mixed crystal according to the present invention is a mixed crystal consisting of a metallophthalocyanine compound (first metallophthalocyanine compound) having at least one trifluoromethyl group and having a central metal selected from the group consisting of cobalt, nickel and copper, and another metallophthalocyanine compound (second metallophthalocyanine compound) optionally having at least one substituent group other than trifluoromethyl group and having a central metal selected from the group consisting of cobalt, nickel and copper. The mixed crystal of the present invention exhibits a peak at 2θ of 5.9 to 6.4° in an X-ray diffraction pattern.

The term "mixed crystal" denotes the state that the molecules of the first and second metallophthalocyanine compounds are each arranged under a certain regularity to form a crystal. The formation of the mixed crystal can be confirmed easily by measuring the X-ray diffraction pattern.

Unless a mixed crystal is formed, a peak is not detected in the X-ray diffraction pattern or the resultant X-ray diffraction pattern will result in the superposition of X-ray diffraction patterns measured independently for each of the first and second metallophthalocyanine compounds even if the first and second metallophthalocyanine compounds have experienced the dissolved state or are mixed at the molecular level by applying a sufficient mechanical force thereto. A peak that is not observed in the individual X-ray diffraction patterns of the first and second metallophthalocyanine compounds is observed in the X-ray diffraction pattern only if a mixed crystal is formed from the first and second metallophthalocyanine compounds. The peak that is inherent in the mixed crystal appears at 2θ of 5.9 to 6.4° in the X-ray diffraction pattern.

The first metallophthalocyanine compound and the second metallophthalocyanine compound form a mixed crystal at a molar ratio of 1:0.8-1.2. If an operation to form a mixed crystal from the first and second metallophthalocyanine compounds is performed at a molar ratio outside this range, a mixture consisting of a mixed crystal of the first and second metallophthalocyanine compounds and the excess portion of the metallophthalocyanine compound (the first or the second metallophthalocyanine compound). This mixture can be used as it is as a phthalocyanine pigment according to the present invention.

The first metallophthalocyanine compound is a compound having a phthalocyanine skeleton, which has at least one trifluoromethyl group on the phthalocyanine skeleton, more specifically on the phenyl ring or rings, and also has a central metal selected from the group consisting of cobalt, nickel and copper. The first metallophthalocyanine compound may have at least one substituent group which the second metallophthalocyanine compound may optionally have, described herein later in detail, in addition to the trifluoromethyl group. Examples of the first metallophthalocyanine compound include, for example, tetra(trifluoromethyl)phthalocyaninatometal, fluoro tetra(trifluoromethyl)phthalocyaninatometal, tri(trifluoromethyl)phthalocyaninatometal, nitro tri(trifluoromethyl)phthalocyaninatometal, methoxy tetra (trifluoromethyl)phthalocyaninatometal, and cyano tetra(trifluoromethyl)phthalocyaninatometal where "metal" denotes cobalt, nickel or copper.

The first metallophthalocyanine compound is known per se in the art (see U.S. Pat. No. 2,225,441, Synth. Comm. 11 (5) 351-363 (1981), and Japanese Patent Application Disclosure (Kokai) Nos. 6-41137 and 2000-275430), and can be synthesized by various synthesizing methods.

It is known in the art that a metallophthalocyanine can generally be prepared by reacting phthalonitrile (or a substituted form thereof) with a metal or a metal salt by heating, or by reacting phthalic acid or phthalimide (or a substituted form thereof) with a metal or a metal salt in urea by heating. In these reactions, a solvent having a high boiling point such as nitrobenzene, and a catalyst such as ammonium molybdate are used. The first metallophthalocyanine compound can be prepared by using phthalonitrile having a trifluoromethyl group or phthalic acid/phthalimide having a trifluoromethyl group as a starting material in these preparation methods. It is also known in the art that the metallophthalocyanine compound can be prepared by cyclizing isoindolenine having a trifluoromethyl group, which is derived from phthalic acid having a trifluoromethyl group, or by cyclizing the intermediate formed during the deriving process of isoindolenine. It is also possible to synthesize the first metallophthalocyanine compound by reacting 1,2-dihalobenzene having a trifluoromethyl group with a cyanide of cobalt, nickel or copper, or through a method in which a trifluoromethyl group is substituted for the carboxyl group of a phthalocyanine having a carboxyl group.

The second metallophthalocyanine compound is a compound having a phthalocyanine skeleton, which may optionally have at least one substituent group other than trifluoromethyl group, and has a central metal selected from the group consisting of cobalt, nickel and copper. In other words, the second metallophthalocyanine compound may be the one having no substituent group on (the phenyl group or groups of) the phthalocyanine skeleton, or the one having at least one substituent group other than trifluoromethyl group. The substituent which the second metallophthalocyanine compound may optionally have includes, for example, a halogen atom, a sulfonic acid group, a sulfonamido group, a sulfoimido group, a carboxylic acid group, a carboxylic acid ester group, a carboamido group, a carboimido group, an alkyl group, an alkoxy group, an alkylthio group, an aryl group, an aryloxy group, arylthio group, a nitro group, an amino group, an alkylamino group, an arylamino group, an acylamino group, and a sulfonylamino group. In any case, the second metallophthalocyanine compound does not have a trifluoromethyl group. Examples of the second metallophthalocyanine compound include, for example, phthalocyanatometal, chlorophthalocyaninatometal, tetranitrophthalocyaninatometal, phthalocyaninatometal sulfonic acid, and monochlorotetranitro-phthalocyaninatometal, where "metal" denotes cobalt, nickel or copper. Such a second metallophthalocyanine compound is commercially available.

The metallophthalocyanine mixed crystal of the present invention can be formed by, for example, an acid pasting method, a dry milling method, or a solvent salt milling method. The solvent salt milling method can also be performed for the purpose of controlling the size/shape of the grains of the metallophthalocyanine mixed crystal formed by the acid pasting method or the dry milling method.

In the acid pasting method, the first and second metallophthalocyanine compounds are dissolved completely in an acid such as phosphoric acid, sulfuric acid or trifluoroacetic acid, followed by pouring the resultant solution into a precipitating solvent to precipitate fine particles of the metallophthalocyanine mixed crystal.

The precipitating solvent used in the acid pasting method is not particularly limited as far as it does not dissolve the first metallophthalocyanine compound, the second metallophthalocyanine compound and the formed metallophthalocyanine mixed crystal, but dissolves the acid used for dissolving the first and second metallophthalocyanine compounds. The precipitating solvent includes, for example, water; alcoholic solvents such as methyl alcohol and 2-propanol; ether solvents such as furan and diethylene glycol diethyl ether; and ketone solvents such as 2-butanone and cyclohexanone.

The amount of the acid used in the acid pasting method is not particularly limited as far as the acid is used in an amount large enough to dissolve completely the two metallophthalocyanine compounds. However, it is economically disadvantageous to use an excessively large amount of the acid. Also, if the amount of the acid used is excessively small, the viscosity of the resultant solution becomes high so as to make it difficult to carry out the operation. Thus, the acid is used in an economically advantageous amount in view of the mixing power of the apparatus used. It is desirable that the first and second metallophthalocyanine compounds is dissolved in the acid at a temperature of 0 to 50° C. At a lower temperature, the viscosity of the acid becomes high so as to lower the dissolving rate. At a higher temperature, the metallophthalocyanine compounds may be decomposed or may react with the acid.

The acid pasting method is industrially carried out in general by using sulfuric acid as the acid and water as the precipitating solvent in view of the cost. More specifically, in the acid pasting method, it is desirable that 1 part by weight in total of the first and second metallophthalocyanine compounds is dissolved in 5 to 30 parts by weight of sulfuric acid and the resultant solution is poured into 30 to 1,000 parts by weight of water. The concentration of sulfuric acid is preferably 96 to 100% by weight. At a concentration lower than 96% by weight, the degree of dissolution of the metallophthalocyanine compounds in sulfuric acid is low, necessitating a large amount of sulfuric acid, which is uneconomical. On the other hand, sulfuric acid at a concentration higher than 100% by weight may give rise to a sulfonation reaction. In the case of using sulfuric acid having the concentration of 96 to 100% by weight, it is particularly desirable that 1 part by weight in total of the first and second metallophthalocyanine compounds is dissolved in 10 to 20 parts by weight of sulfuric acid and the resultant solution is poured into 100 to 200 parts by weight of water.

The temperature at which the first and second metallophthalocyanine compounds are dissolved in sulfuric acid is preferably 0 to 50° C. At a temperature lower than 0° C., sulfuric acid may be frozen, and the degree of dissolution of the two metallophthalocyanine compounds is low. At a temperature higher than 50° C., a side reaction may occur. The temperature of water into which the sulfuric acid solution of the two metallophthalocyanine compounds is poured is preferably 1 to 60° C., and ice water is used industrially as such water. If the sulfuric acid solution is poured into water at a temperature higher than 60° C., the water may be boiled by the heat of dissolution of sulfuric acid, which is hazardous to the operation. On the other hand, if the sulfuric acid solution is cooled to a temperature lower than 1° C., the solution may be frozen. The pouring time is preferably 0.1 to 30 minutes. With a longer pouring time, the resultant particles of the metallophthalocyanine mixed crystal are enlarged, which can be dispersed easily. Therefore, the pouring time can be selected such that the desired particle size required for the particular application may be obtained.

In the dry milling method, the first and second metallophthalocyanine compounds are dry mixed while applying an impact force to them.

The impact force can be conveniently obtained by vibrating the two metallophthalocyanine compounds together with beads so as to collide the two metallophthalocyanine compounds against the beads. The vibration can be obtained by, for example, rotating a container housing the two metallophthalocyanine compounds together with the beads or by rotating a stirring vane set in a container housing the two metallophthalocyanine compounds together with the beads so as to move the beads.

Steel beads are used in many cases because they are low in cost and can be handled easily. The amount of beads may be 5 to 500 parts by weight, preferably 10 to 50 parts by weight, based on 1 part by weight in total of the first and second metallophthalocyanine compounds. If the amount of the beads is smaller than 5 parts by weight, the beads and the two metallophthalocyanine compounds fail to circulate sufficiently. On the other hand, if the amount of the beads exceeds 500 parts by weight, the efficiency of the mixed crystal formation is lowered, which is markedly disadvantageous in economy. If the total weight of the beads and the two metallophthalocyanine compounds is too large, the cost required for the vibration is correspondingly increased. In view of this, it is desirable that the total weight of the beads and the two metallophthalocyanine compounds is 10 to 50 parts by weight, within which the beads and the metallophthalocyanine compounds can be vibrated easily.

The diameter of the beads is not particularly limited, and can be selected in accordance with the vibrating power of the vibrating apparatus. For example, in the case of rotating a 0.3-L (liter) container to vibrate the beads and the two metallophthalocyanine compounds housed in the container, the formation of the mixed crystal is finished most promptly in the case of using the beads having a diameter of 15 to 20 mm. On the other hand, in the case of moving the beads by setting a stirring vane in a 1-L container, the formation of the mixed crystal is finished most promptly in the case of using the beads having a diameter of 8 to 12 mm. It is unnecessary to control the temperature. The mixed crystal can be formed within a temperature range of 20 to 200° C.

In the solvent salt milling method, a small amount of an organic solvent is added as a wetting agent to a mixture of the first and second metallophthalocyanine compounds and a water-soluble inorganic salt, followed by strongly kneading the mixture by using, e.g., a kneader. The resultant kneaded material is put in water and stirred by, e.g., a high speed mixer to prepare a slurry. The slurry thus prepared is filtered, washed with water and dried to prepare a desired metallophthalocyanine mixed crystal. In the solvent salt milling method, the forming rate of the mixed crystal is low. Thus, the solvent salt milling method is usually employed to control the size/shape of the mixed crystal grains formed by the acid pasting method or the dry milling method. However, the solvent salt milling method can form the mixed crystal if it is conducted for a longer period of time.

As to the ratio between the metallophthalocyanine compounds and the inorganic salt used in the solvent salt milling method, where the proportion of the inorganic salt is high, the pulverizing efficiency is improved, though the forming efficiency and the productivity of the metallophthalocyanine mixed crystal is lowered. On the other hand, if the proportion of the inorganic salt is low, it is difficult to achieve a uniform kneading, though the forming efficiency of the metallophthalocyanine mixed crystal is improved. In general, it is desirable to use the inorganic salt in an amount of 2 to 40 parts by weight, particularly 3 to 25 parts by weight, relatively to 1 part by weight in total of the first and second metallophthalocyanine compounds. Also, the wetting agent is added to help the mixture of the metallophthalocyanine compounds and the inorganic compound to form a uniform mass. Although the amount of the wetting agent may depend on the ratio between the metallophthalocyanine compounds and the inorganic salt, the wetting agent is usually used in an amount of 50 to 300% by weight based on the total amount of the first and second metallophthalocyanine compounds.

The inorganic salt used in the solvent salt milling method is not particularly limited as far as it is soluble in water; however, sodium chloride, sodium sulfate and/or barium bromide, for example, is used in view of the cost.

The organic solvent used in the solvent salt milling method is not particularly limited as far as it is soluble in water. However, it is desirable in terms of safety to use a solvent having a high boiling point because the temperature is elevated during the salt milling stage so as to cause the solvent to be evaporated easily. Examples of such a solvent include, for example, 2-methoxyethanol, 2-butoxyethanol, 2-(isopentyloxy)ethanol, 2-(hexyloxy)ethanol, diethylene glycol, diethylene glycol monomethyl ether, diethylene glycol diethyl ether, diethylene glycol monoethyl ether, diethylene glycol monobutyl ether, triethylene glycol, triethylene glycol monomethyl ether, a liquid polyethylene glycol, 1-methoxy-2-propanol, 1-ethoxy-2-propanol, dipropylene glycol, dipropylene glycol monomethyl ether, dipropylene glycol monoethyl ether, and a low molecular weight polypropylene glycol.

A phthalocyanine pigment according to the present invention may be formed of the metallophthalocyanine mixed crystal of the invention alone, or may contain a metallophthalocyanine compound in addition to the metallophthalocyanine mixed crystal of the invention. Examples of such an additional metallophthalocyanine compound include the first metallophthalocyanine compound and the second metallophthalocyanine compound described above. Usually, the amount of the additional metallophthalocyanine compound, which may be contained in the phthalocyanine pigment of the present invention in addition to the metallophthalocyanine mixed crystal, is 0.1 to 400% by weight based on the amount of the metallophthalocyanine mixed crystal of the present invention.

Examples of the present invention will now be described. Needless to say, the present invention is not limited by the following Examples.

Synthetic Example 1

Synthesis 1 of a Metallophthalocyanine Compound Having Trifluoromethyl Groups

Figure 3:
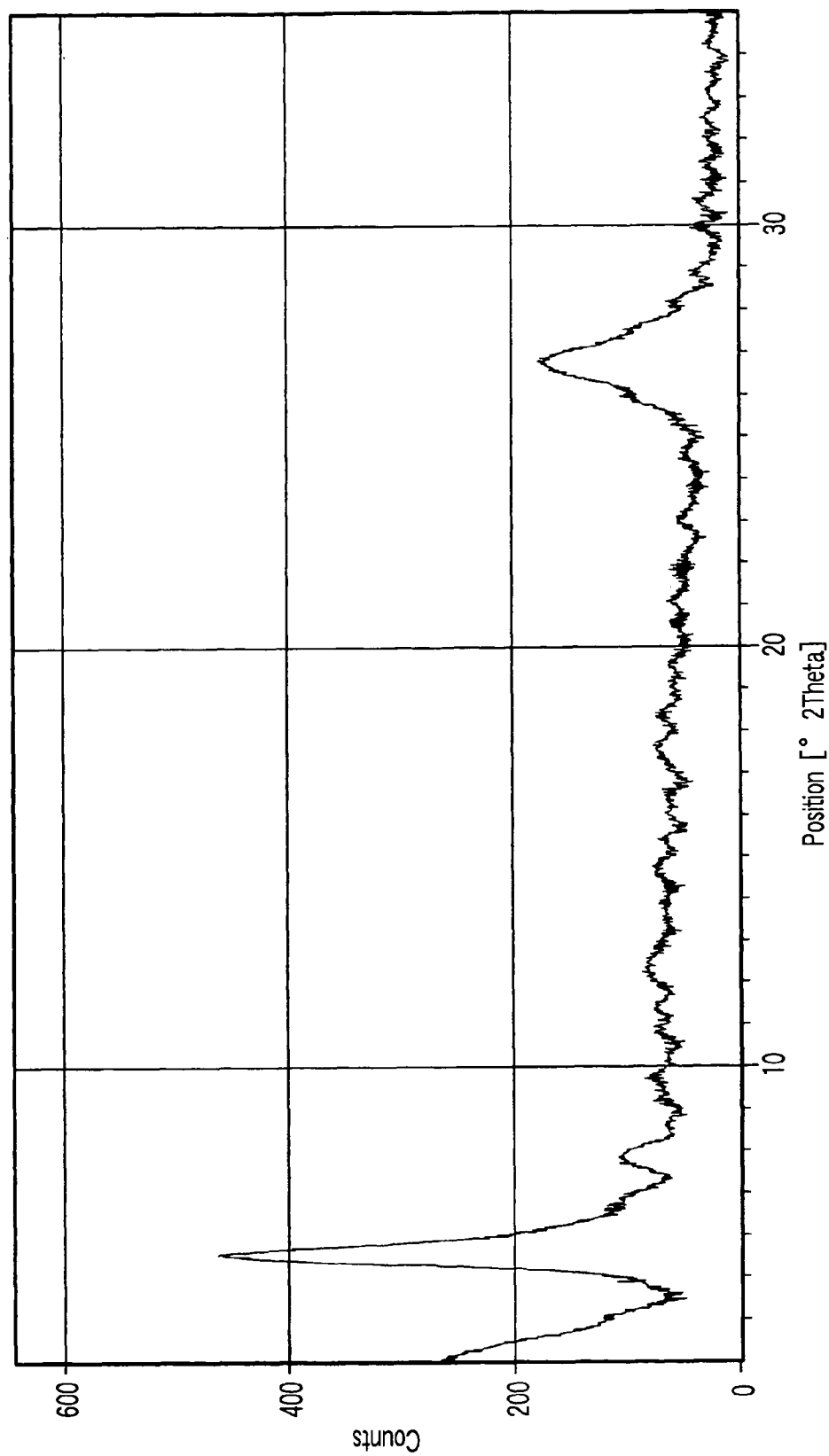
FIG. 3 is an X-ray diffraction pattern of tetra(trifluoromethyl)phthalocyaninatocopper prepared in Synthetic Example 1, which will be described herein later.

In a 5-L four-mouth flask equipped with a water-cooling pipe, a stirrer, a thermometer, and a nitrogen gas introducing port, 292.5 g of 4-trifluoromethylphthalic acid (available from Japan Agricultural Medicine Co., Ltd.), 31.24 g of copper (I) chloride, 375 g of urea, 1.0 g of ammonium molybdate tetrahydrate and 1.5 kg of nitrobenzene were charged, and the heating of the mixture was started under a nitrogen gas stream. Supply of the nitrogen gas stream was stopped at the time when the mixture was heated to 140° C. Then, the mixture was further heated to 180° C., and the mixture was maintained at that temperature for 6 hours. Thereafter, the reaction mixture was cooled, and methanol was added to form a uniform slurry. The slurry was filtered, washed with a 1% aqueous solution of hydrochloric acid, N-methyl-2-pyrrolidone, a 1% aqueous solution of sodium hydroxide and a warm water of 50° C., and was dried at 110° C. Thus, 201.4 g of tetra(trifluoromethyl)phthalocyaninatocopper was obtained. It was confirmed by the field desorption mass spectrometry (FD-MS) that the molecular weight of this compound was 847 Da. FIG. 3 shows the X-ray diffraction pattern of this compound.

Synthetic Example 2

Synthesis 2 of Metallophthalocyanine Compound Having Trifluoromethyl Groups

In a 5-L four-mouth flask equipped with a water-cooling pipe, a stirrer, a thermometer, and a nitrogen gas introducing port, 292.5 g of 4-trifluoromethylphthalic acid (available from Japan Agricultural Medicine Co., Ltd.), 40.60 g of cobalt (II) chloride, 375 g of urea, 1.0 g of ammonium molybdate tetrahydrate and 1.5 kg of nitrobenzene were charged, and the heating of the mixture was started under a nitrogen gas stream. Supply of the nitrogen gas stream was stopped at the time when the mixture was heated to 140° C. Then, the mixture was further heated to 200° C., and the mixture was maintained at that temperature for 6 hours. Thereafter, the reaction mixture was cooled, and methanol was added to form a uniform slurry. The slurry was filtered, washed with a 1% aqueous solution of hydrochloric acid, N-methyl-2-pyrrolidone, a 1% aqueous solution of sodium hydroxide and a warm water of 50° C., and was dried at 110° C. Thus, 162.7 g of tetra(trifluoromethyl)phthalocyaninatocobalt was obtained. It was confirmed by FD-MS that the molecular weight of this compound was 843 Da.

Synthetic Example 3

Synthesis 3 of Metallophthalocyanine Compound Having Trifluoromethyl Groups

The same procedures were followed as in Synthetic Example 2, except that 40.51 g of nickel (II) chloride was used in place of the cobalt chloride, preparing 156.4 g of tetra(trifluoromethyl)-phthalocyaninatonickel. It was confirmed by FD-MS that the molecular weight of this compound was 842 Da.

Example 1

In a 1-L attritor, 30 g of tetra(trifluoromethyl)-phthalocyaninatocopper prepared in Synthetic Example 1, 30 g of α-type phthalocyaninatocopper ("No. 20-782 Cyanine Blue" available from Toyo Ink Mfg. Co., Ltd.) and 2 kg of steel beads each having a diameter of 9 mm were charged, and the mixture was stirred for one hour. Then, the beads were separated from the mixture so as to obtain a metallophthalocyanine mixed crystal.

The measurement of θ-2θ for the metallophthalocyanine mixed crystal thus obtained was conducted at room temperature by using a CuKα-ray in an X-ray diffraction apparatus ("X'pert-PRO" available from Philips Analytical Co., Ltd). FIG. 1 shows the X-ray diffraction pattern. As apparent from FIG. 1, a peak attributable to tetra(trifluoromethyl)-phthalocyaninatocopper was not found in the X-ray diffraction pattern, and a clear peak supporting the formation of a mixed crystal was observed at 2θ of 6.1°. Incidentally, a peak was not observed at 2θ of 5.9°-6.4° in any of the X-ray diffraction patterns (see FIGS. 3 and 4) of tetra(trifluoromethyl)-phthalocyaninatocopper, and α-type phthalocyaninatocopper ("No. 20-782 Cyanine Blue" available from Toyo Ink Mfg. Co., Ltd.) dried at 110° C.

Example 2

10 g of tetra(trifluoromethyl)-phthalocyaninatocopper obtained in Synthetic Example 1 and 10 g of α-phthalocyaninatocopper ("No. 20-782 Cyanine Blue" available from Toyo Ink Mfg. Co., Ltd.) dried at 110° C. were added in portions simultaneously to 500 g of sulfuric acid (concentration: 96% by weight) while maintaining the temperature at 15 to 25° C. After completion of the addition, the reaction mixture was kept stirred for 2 hours. Then, the resultant sulfuric acid solution of the metallophthalocyanine compounds was added over 2 minutes to 5 L of ice water which was stirred. The temperature at the completion of the addition of the sulfuric acid solution was 12° C. Then, the sulfuric acid was removed by a combination of decantation and filtration. After the final filtration stage, the filtrate was dried at 110° C., affording a metallophthalocyanine mixed crystal.

Figure 2:
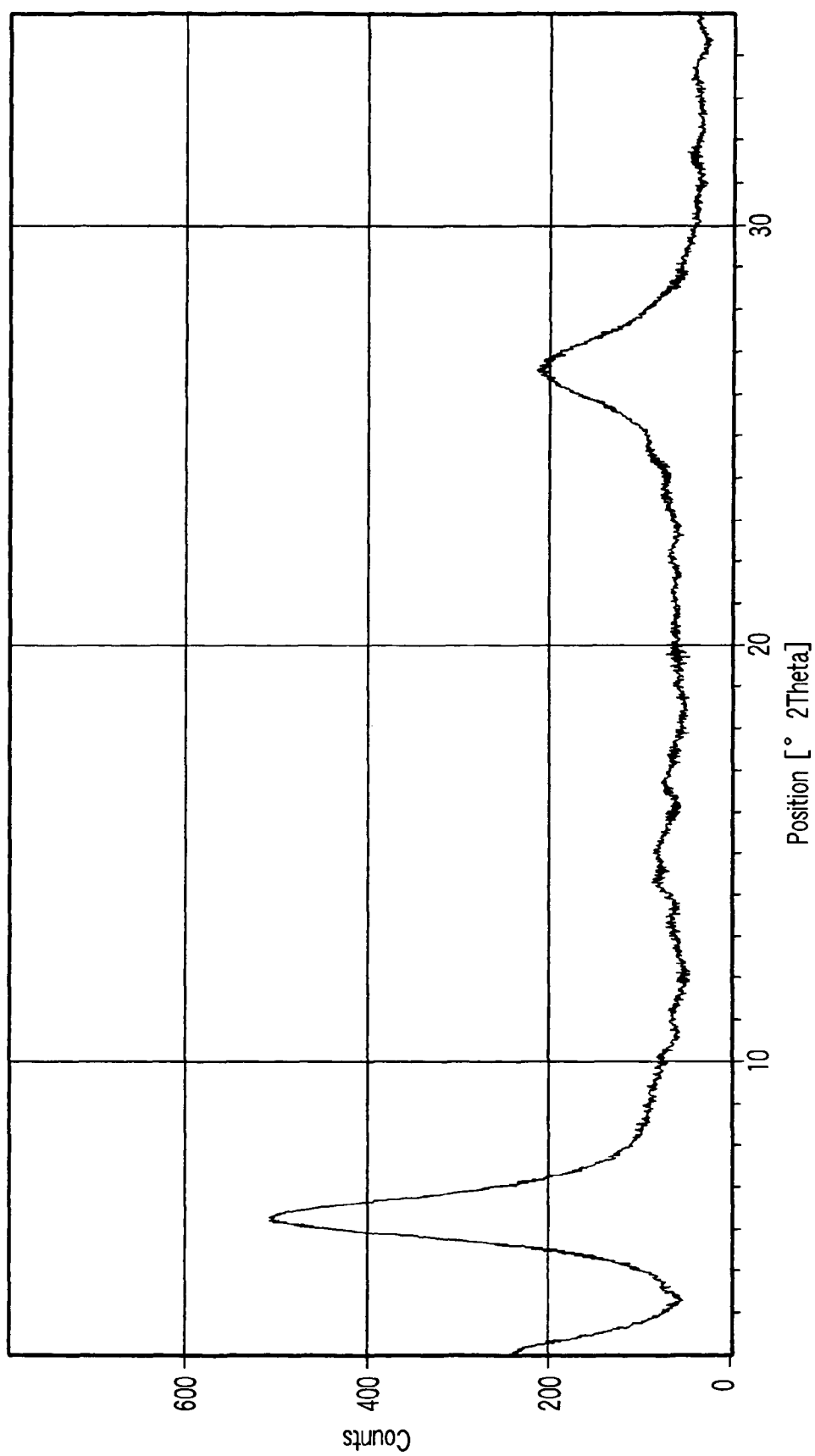
FIG. 2 is an X-ray diffraction pattern of the metallophthalocyanine mixed crystal prepared in Example 2, which will be described herein later.

The measurement of θ-2θ for the metallophthalocyanine mixed crystal thus obtained was conducted as in Example 1. FIG. 2 shows the X-ray diffraction pattern. As apparent from FIG. 2, a peak attributable to tetra(trifluoromethyl)-phthalocyaninatocopper was not observed in the X-ray diffraction pattern shown in FIG. 2, and a clear peak supporting the formation of the mixed crystal was observed at 2θ of 6.3°.

Example 3

A metallophthalocyanine mixed crystal was prepared as in Example 1, except that an ε-type phthalocyaninatocopper ("Lionol Blue ES" available from Toyo Ink Mfg. Co., Ltd.) was used in place of the α-type phthalocyaninatocopper. The measurement of θ-2θ for the metallophthalocyanine mixed crystal thus obtained was conducted at room temperature by using the CuKα-ray in the X-ray diffraction apparatus as in Example 1. A peak attributable to the tetra(trifluoromethyl) phthalocyaninatocopper was not observed in the X-ray diffraction pattern, and a clear peak supporting the formation of a mixed crystal was observed at 2θ of 6.2°.

Example 4

A metallophthalocyanine mixed crystal was prepared as in Example 2, except that phthalocyaninatocobalt available from Sanyo Shikiso K.K. was used in place of the α-type phthalocyaninatocopper. The measurement of θ-2θ for the metallophthalocyanine mixed crystal thus obtained was conducted as in Example 1. A peak attributable to the tetra(trifluoromethyl)-phthalocyaninatocopper was not observed in the X-ray diffraction pattern, and a clear peak supporting the formation of a mixed crystal was observed at 2θ of 6.2°.

Example 5

A metallophthalocyanine mixed crystal was prepared as in Example 2, except that tetra(trifluoromethyl)-phthalocyaninatocobalt prepared in Synthetic Example 2 was used in place of the tetra(trifluoromethyl)phthalocyaninatocopper and phthalocyaninatocobalt available from Sanyo Shikiso K.K. was used in place of the α-type phthalocyaninatocopper. The measurement of θ-2θ for the metallophthalocyanine mixed crystal thus obtained was conducted as in Example 1. A peak attributable to the tetra(trifluoromethyl)phthalocyaninatocobalt was not observed in the X-ray diffraction pattern, and a clear peak supporting the formation of the mixed crystal was observed at 2θ of 6.1°.

Example 6

A metallophthalocyanine mixed crystal was prepared as in Example 2, except that tetra(trifluoromethyl)-phthalocyaninatonickel obtained in Synthetic Example 3 was used in place of the tetra(trifluoromethyl)phthalocyaninatocopper, and ε-type phthalocyaninatocopper ("Lionol Blue ES" available from Toyo Ink Mfg. Co., Ltd.) was used in place of the α-type phthalocyaninatocopper. The measurement of θ-2θ for the metallophthalocyanine mixed crystal thus obtained was conducted as in Example 1. A peak attributable to the tetra(trifluoromethyl)-phthalocyaninatonickel was not observed in the X-ray diffraction pattern, and a clear peak supporting the formation of a mixed crystal was observed at 2θ of 6.2°.

Example 7

5 g of tetra(trifluoromethyl)-phthalocyaninatocopper prepared in Synthetic Example 1 and 15 g of α-phthalocyaninatocopper ("No. 20-782 Cyanine Blue" available from Toyo Ink Mfg. Co., Ltd.) dried at 110° C. were added in portions simultaneously to 500 g of sulfuric acid (concentration: 96% by weight) while maintaining the temperature at 15 to 25° C. After completion of the addition, the reaction mixture was kept stirred for 2 hours. The resultant sulfuric acid solution of the metallophthalocyanine compounds was added over 2 minutes to 5 L of ice water which was kept stirred. The temperature at the completion of the addition of the sulfuric acid solution was 12° C. Then, the sulfuric acid was removed by a combination of decantation and filtration. After the final filtration stage, the filtrate was dried at 110° C., affording a metallophthalocyanine mixed crystal.

The measurement of θ-2θ for the metallophthalocyanine mixed crystal thus obtained was conducted as in Example 1. A peak attributable to the tetra(trifluoromethyl)-phthalocyaninatocopper was not observed in the X-ray diffraction pattern, and a clear peak supporting the formation of the mixed crystal was observed at 2θ of 6.2°. In addition, a peak attributable to the α-type phthalocyaninatocopper was observed at 2θ of 6.8° and 7.2°. Thus, it has been found that the metallophthalocyanine crystal obtained in this Example contained the mixed crystal of the tetra(trifluoromethyl)phthalocyaninatocopper and the α-type phthalocyaninatocopper, as well as the α-type phthalocyaninatocopper crystal.

Example 8

15 g of tetra(trifluoromethyl)-phthalocyaninatocopper prepared in Synthetic Example 1 and 5 g of α-phthalocyaninatocopper ("No. 20-782 Cyanine Blue" available from Toyo Ink Mfg. Co., Ltd.) dried at 110° C. were added in portions simultaneously to 500 g of sulfuric acid (concentration: 96% by weight) while maintaining the temperature at 15 to 25° C. After completion of the addition, the reaction mixture was kept stirred for 2 hours. The resultant sulfuric acid solution of the metallophthalocyanine compounds was added over 2 minutes to 5 L of ice water which was kept stirred. The temperature at the completion of the addition of the sulfuric acid solution was 12° C. Then, the sulfuric acid was removed by a combination of decantation and filtration. After the final filtration stage, the filtrate was dried at 110° C., affording a metallophthalocyanine mixed crystal.

The measurement of θ-2θ for the metallophthalocyanine mixed crystal thus obtained was conducted as in Example 1. A peak attributable to the tetra(trifluoromethyl)-phthalocyaninatocopper was observed at 2θ of 5.5° in the X-ray diffraction pattern, and a clear peak supporting the formation of the mixed crystal was also observed at 2θ of 6.2°. However, a peak attributable to the α-type phthalocyaninatocopper, was not observed. Thus, it has been found that the metallophthalocyanine crystal obtained in this Example contained a mixed crystal of the tetra(trifluoromethyl)phthalocyaninatocopper and the α-type phthalocyaninatocopper, as well as the tetra(trifluoromethyl)phthalocyaninatocopper crystal.

Comparative Example 1

20 g of tetra(trifluoromethyl)-phthalocyaninatocopper prepared in Synthetic Example 1 was added in portions to 500 g of sulfuric acid (concentration: 96% by weight) while maintaining the temperature at 15 to 25° C. After completion of the addition, the mixture was kept stirred for 2 hours. The resultant sulfuric acid solution was added over 2 minutes to 5 L of ice water which was kept stirred. The temperature at the completion of the addition of the sulfuric acid solution was 14° C. Then, the sulfuric acid was removed by a combination of decantation and filtration. After the final filtration stage, the filtrate was dried at 110° C., affording a pigment (TFM pigment) consisting of tetra(trifluoromethyl)-phthalocyaninatocopper.

Figure 4:
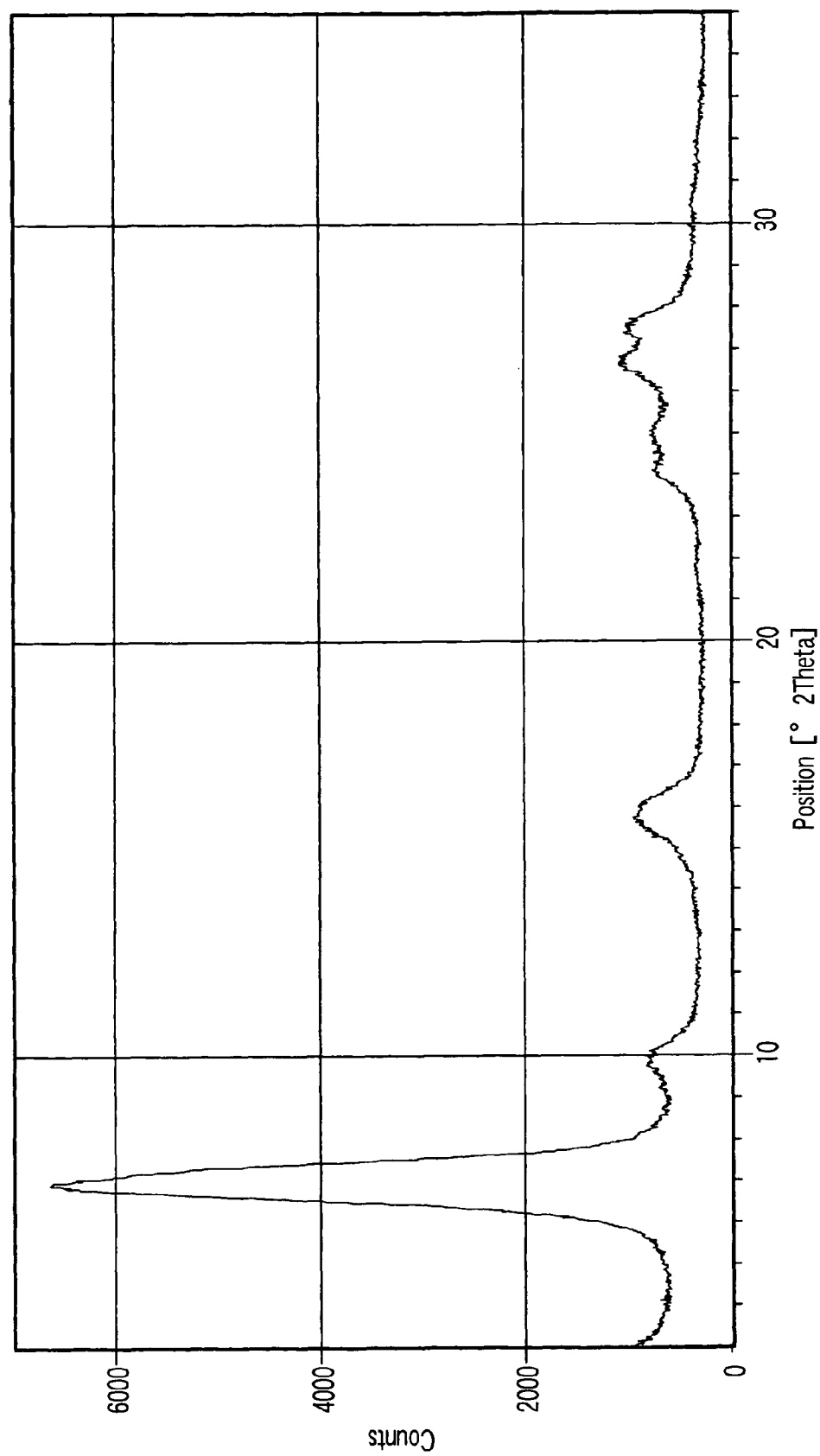
FIG. 4 is an X-ray diffraction pattern of α-type phthalocyaninatocopper dried at 110° C.

Comparative Example 2

α-type phthalocyaninatocopper ("No. 20-782 Cyanine Blue" available from Toyo Ink Mfg. Co., Ltd.) was dried at 110° C. FIG. 4 shows the X-ray diffraction pattern of the dried α-type phthalocyaninatocopper.

Comparative Example 3

A pigment composition was prepared by simply mixing 0.06 g of the α-type phthalocyaninatocopper dried in Comparative Example 2 and 0.24 g of TFM pigment.

<Ink Test>

0.3 g of the metallophthalocyanine mixed crystal prepared in Example 1 or the phthalocyanine pigment of any of Comparative Examples 1 to 3 was dispersed in 1.5 g of varnish using a rosin-modified phenolic resin for a web offset printing press to prepare an ink, and the ink was applied to a white paper sheet. The C value and the H value of the ink on the white paper sheet were measured using the C-light source 2-deg color matching functions by a spectrophotometer ("SPECTROPHOTOMETER CM3600d" available from MINOLTA K.K.). Table 1 shows the results.

TABLE 1

|  | C value | H value |
|---|---|---|
| Example 1 | 50.23 | 278.37 |
| Comp. Example 1 | 49.15 | 272.66 |
| Comp. Example 2 | 50.76 | 282.19 |
| Comp. Example 3 | 48.13 | 278.01 |

Note that the larger C value is, the higher the clearness is. On the other hand, a smaller H value indicates a blue color exhibiting a greenish color tone, and a large H value indicates a blue color exhibiting a reddish color tone. From the results given in Table 1, it is seen that the ink prepared by using the metallophthalocyanine mixed crystal obtained in Example 1 differs in the hue (H value) from the ink using the pigment obtained in Comparative Example 1 or 2. It can also be seen from Table 1 that the ink prepared by using the metallophthalocyanine mixed crystal obtained in Example 1 is larger in the C value than the ink prepared by using the pigment composition obtained in Comparative Example 3 which was prepared so as to be made equal to the ink of Example 1 in the hue (H value), indicating that the ink of Example 1 exhibits a clearness higher than that of the ink of Comparative Example 3.

As described above, the metallophthalocyanine mixed crystal of the present invention exhibits a clear blue hue differing from the hue of the conventional crystal type copper phthalocyanine pigment, and therefore can achieve a color variation conforming with the diversification of tastes without sacrificing the clearness. The metallophthalocyanine mixed crystal of the present invention can be utilized for coloration of, e.g., an ink and a paint.

What is claimed is:

1. A phthalocyanine pigment comprising a mixed crystal consisting of a first metallophthalocyanine compound

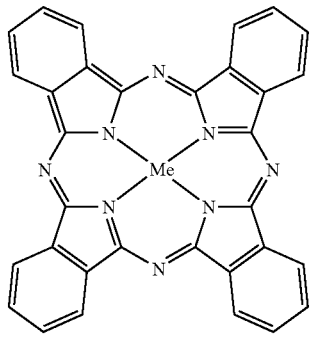

selected from metallophthalocyanine compounds having at least one trifluoromethyl group and having a central metal Me selected from the group consisting of cobalt, nickel and copper, and a second metallophthalocyanine compound

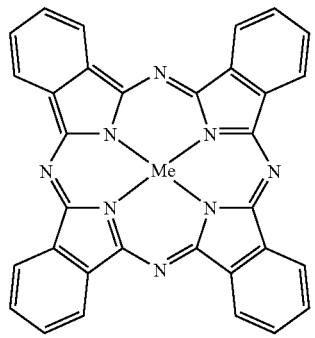

selected from metallophthalocyanine compounds optionally having at least one substituent group other than trifluoromethyl group and having a central metal Me selected from the group consisting of cobalt, nickel and copper, the mixed crystal exhibiting a peak at 2θ of 5.9 to 6.4° in X-ray diffractometry.

2. The pigment according to claim 1, wherein the first metallophthalocyanine compound and the second metallophthalocyanine compound are present at a molar ratio of 1:0.8-1.2 in the mixed crystal.

3. The phthalocyanine pigment according to claim 1, wherein the first metallophthalocyanine compound comprises tetra(trifluoromethyl)phthalocyaninatometal, fluoro tetra(trifluoromethyl)phthalocyaninatometal, tri(trifluoromethyl)phthalocyaninatometal, nitro tri(trifluoromethyl)phthalocyaninatometal, methoxy tetra(trifluoromethyl)phthalocyaninatometal, or cyano tetra(trifluoromethyl)phthalocyaninatometal, where the metal denotes cobalt, nickel or copper, and the second metallophthalocyanine compound comprises phthalocyaninatometal, chlorophthalocyaninatometal, tetranitrophthalocyaninatometal, phthalocyaninatometal sulfonic acid, and monochlorotetranitrophthalocyaninatometal, where the metal denotes cobalt, nickel or copper.

* * * * *